United States Patent
Takeda et al.

(10) Patent No.: US 9,535,249 B2
(45) Date of Patent: Jan. 3, 2017

(54) VIRTUAL IMAGE DISPLAY APPARATUS

(71) Applicant: SEIKO EPSON CORPORATION, Tokyo (JP)

(72) Inventors: Takashi Takeda, Suwa (JP); Takahiro Totani, Suwa (JP); Masayuki Takagi, Shiojiri (JP); Akira Komatsu, Tatsuno-Machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 338 days.

(21) Appl. No.: 14/079,153

(22) Filed: Nov. 13, 2013

(65) Prior Publication Data

US 2014/0139553 A1 May 22, 2014

(30) Foreign Application Priority Data

Nov. 19, 2012 (JP) .................................. 2012-252967

(51) Int. Cl.
*G09G 5/00* (2006.01)
*G02B 27/01* (2006.01)
*G02B 26/10* (2006.01)

(52) U.S. Cl.
CPC ............. *G02B 27/017* (2013.01); *G02B 26/10* (2013.01); *G02B 2027/011* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 6,313,864 | B1* | 11/2001 | Tabata | G09G 5/00 345/8 |
| 8,878,749 | B1* | 11/2014 | Wu | G01S 17/06 345/8 |
| 9,096,920 | B1* | 8/2015 | Gomez | C23C 4/06 |
| 2006/0050087 | A1* | 3/2006 | Tanimura | G06F 3/011 345/629 |
| 2007/0171497 | A1 | 7/2007 | Ishihara et al. | |
| 2009/0309959 | A1* | 12/2009 | Iwai | G03B 21/00 348/54 |
| 2010/0091027 | A1 | 4/2010 | Oyama et al. | |

(Continued)

FOREIGN PATENT DOCUMENTS

| | | |
|---|---|---|
| JP | A-2007-178941 | 7/2007 |
| JP | A-2007-199251 | 8/2007 |

(Continued)

*Primary Examiner* — David H Chu
(74) *Attorney, Agent, or Firm* — Oliff PLC

(57) ABSTRACT

A trapezoidal correction processing portion performs trapezoidal correction (distortion correction) on video image areas each of which is divided into a plurality of video image areas separately in accordance with the divided video image areas. In this case, each of the video image areas is divided into a plurality of areas. Further, a pair of right and left virtual image formation sections perform trapezoidal correction in a mirror symmetric manner, and the center position of the wearer's eye in each of the virtual image formation sections is so adjusted that the center position coincides with a distortion-free image corrected by using a small amount of correction.

16 Claims, 10 Drawing Sheets

(56) References Cited

U.S. PATENT DOCUMENTS

| | | | |
|---|---|---|---|
| 2010/0103077 A1* | 4/2010 | Sugiyama | G02B 27/017 345/8 |
| 2011/0205242 A1* | 8/2011 | Friesen | G06F 3/011 345/633 |
| 2012/0327116 A1* | 12/2012 | Liu | G09G 5/377 345/633 |
| 2013/0201210 A1* | 8/2013 | Vaddadi | G01B 11/25 345/632 |
| 2013/0278631 A1* | 10/2013 | Border | G02B 27/017 345/633 |
| 2014/0106710 A1* | 4/2014 | Rodriguez | H04M 1/7253 455/411 |
| 2014/0327604 A1 | 11/2014 | Oyama et al. | |

FOREIGN PATENT DOCUMENTS

| | | |
|---|---|---|
| JP | 2010-091944 A | 4/2010 |
| JP | 2010-096864 A | 4/2010 |

\* cited by examiner

VIRTUAL IMAGE DISPLAY APPARATUS

BACKGROUND

1. Technical Field

The present invention relates to a virtual image display apparatus, such as a head-mounted display worn around the head for use.

2. Related Art

In recent years, as a virtual image display apparatus that allows formation and observation of a virtual image, such as a head-mounted display, there is, for example, a proposed apparatus in which the retina of each eye is so scanned with image light that an image is projected onto the retina, and the apparatus has a see-through configuration that allows the image light, which forms a virtual image, to be superimposed on outside light that is light from the outside (see JP-A-2007-178941).

To project light that will form an image in an oblique direction, it is, for example, necessary to perform distortion correction in which distortion produced in a projected image undergoes trapezoidal correction or any other type of correction. In contrast, as a technology used with a scanning image display apparatus that performs image projection based on optical scanning, there is a known technology that corrects trapezoidal distortion by changing the amplitude of deflection in an image projection process (see JP-A-2007-199251), although the technology is not intended for a head-mounted display. In a head-mounted display, to perform image projection in an oblique direction, for example, from the ear or nose side, some type of correction is necessary to correct image distortion as in a typical image display apparatus. It is also conceivable to perform correction, such as trapezoidal correction, on an image based on signal processing in a unit that produces the image.

When trapezoidal correction or any other type of correction is performed on a projected image, a greater amount of correction in general results in not only a smaller projected image and hence lower resolution but also a larger unused, waste area. To produce a high-definition image, for example, it is therefore necessary to form a higher-resolution image. However, in a head-mounted display, which is particularly required to be compact and lightweight, the resolution provided by an image generator is limited. Further, in a head-mounted display, each component desirably has a simple structure because the apparatus needs to be compact and lightweight, and when image projection is performed based, for example, on optical scanning, the structure of the apparatus is preferably simple, unlike the apparatus capable of controlling complicated optical scanning described in JP-A-2007-199251.

SUMMARY

An advantage of some aspects of the invention is to provide a virtual image display apparatus that performs trapezoidal correction in image projection in such a way that the amount of trapezoidal correction is reduced to minimize an unused, waste area and increase a video image area effectively used to display a distortion-free image.

A first aspect of the invention is directed to a virtual image display apparatus including: (a) an image processing section that processes an image signal that allows a user to visually recognize a virtual image in accordance with an input signal, (b) a video image generation section that generates light that allows the user to visually recognize the virtual image in accordance with the image signal from the image processing section, and (c) a virtual image formation section that allows the user to visually recognize the light from the video image generation section in the form of the virtual image displayed in an imaginary video image area, (d) when the video image generation section generates the light and the virtual image formation section allows the user to visually recognize the light from the video image generation section in the form of the virtual image, trapezoidal distortion is produced at least in one of horizontal and vertical directions, (e) the image processing section includes a trapezoidal correction processing portion that performs trapezoidal correction on the virtual image to be recognized by the user, and (f) the image processing section divides the video image area, which the virtual image formation section allows the user to visually recognize, into a plurality of divided video image areas, and the trapezoidal correction processing portion performs trapezoidal correction in correspondence with each of the divided video image areas.

In the virtual image display apparatus described above, the trapezoidal correction processing portion can perform image processing including trapezoidal correction on the video image area, which is divided into a plurality of video image areas in the virtual image formation section, separately in accordance with the divided video image areas. In this case, dividing the video image area into a plurality of areas, for example, reduces the size of an unused, waste area and hence increases the size of the video image area to be used. Further, in this case, the amount of correction in an area that undergoes trapezoidal correction among the divided video image areas, which are obtained by dividing the video image area, can be smaller than the amount of correction in a case where the entire video image area is handled, for example, as a single rectangular area for trapezoidal correction. As a result, a decrease in resolution resulting from the distortion correction can be suppressed. Further, providing the plurality of video image areas allows a wide variety of types of information display.

In a specific aspect of the invention, the trapezoidal correction processing portion performs individual trapezoidal correction in correspondence with each of the divided video image areas. In this case, a distortion-corrected image can be formed in each of the divided video image areas, which are obtained by dividing the video image area. In this process, the amount of correction can be smaller than the amount of correction in a case where the entire video image area is handled as a single rectangular area for trapezoidal correction.

In another aspect of the invention, the image processing section processes the image signal in such a way that the divided video image areas include a first video image area that is located in an inner position and a second video image area that is located in an outer position. The phrase "located in an inner position" means that the video image area in question is located closer to the nose of the user (wearer) who wears the apparatus than the other video image area, and the phrase "located in an outer position" means that the video image area in question is located closer to the ear of the user who wears the apparatus than the other video image area. In this case, depending on whether the projection direction is an outward direction or an inward direction, the degree of produced distortion in an image differs between the inner and outer video image areas in some cases. It is, however, possible, for example, to form primary video images in the video image area where the amount of distortion is smaller and form secondary video images representing information that assists the primary video images in the other video image area.

In still another aspect of the invention, the virtual image display apparatus further includes an input reception section that receives an instruction from the user, and the image processing section displays an icon related to the receiving action of the input reception section in the second video image area, which the virtual image formation section allows the user to visually recognize. In this case, the user can intentionally select video images or any other images to be displayed in the first video image area by operating the apparatus based, for example, on information displayed in the second video image area.

In yet another aspect of the invention, the virtual image formation section is formed of a pair of a right-eye-side virtual image formation section and a left-eye-side virtual image formation section that correspond to the right and left eyes respectively. The image processing section processes the image signal in such a way that the first video image area of the video image area that the right-eye-side virtual image formation section allows the user to visually recognize includes a right-eye-side first video image area and the second video image area of the video image area that the right-eye-side virtual image formation section allows the user to visually recognize includes a right-eye-side second video image area. The image processing section processes the image signal in such a way that the first video image area of the video image area that the left-eye-side virtual image formation section allows the user to visually recognize includes a left-eye-side first video image area and the second video image area of the video image area that the left-eye-side virtual image formation section allows the user to visually recognize includes a left-eye-side second video image area. The image processing section displays video images common to the right and left sides in the right-eye-side first video image area and the left-eye-side first video image area. In this case, the user can recognize the video images in the right-eye-side first video image area and the video images in the left-eye-side first video image area as the same common images. Further, the user can recognize different video images displayed in the right-eye-side second video image area and the left-eye-side second video image area.

In still yet another aspect of the invention, the image processing section displays independent video images formed in the right-eye-side second video image area and displays other independent video images formed in the left-eye-side second video image area. In this case, video images can be so displayed that a central image can be formed of a single common image recognizable with the right and left eyes, and that images recognized at the peripheries can be formed of a right independent image recognizable only with the right eye and a different left independent image recognizable only with the left eye.

In further another aspect of the invention, the trapezoidal correction processing portion performs trapezoidal correction only on the right-eye-side first video image area and the left-eye-side first video image area, where the video images common to the right and left sides are displayed. In this case, among the recognized video images, the central video images can be corrected and aligned with each other on a pixel basis and hence recognized as video images common to the right and left sides. On the other hand, since the video images at the peripheries substantially require no correction, image processing burden can be reduced.

In still further another aspect of the invention, the image processing section forms the right-eye-side second video image area, which the right-eye-side virtual image formation section allows the user to visually recognize, in a range outside the vision of the user when the user moves the line of sight leftward, whereas forming the left-eye-side second video image area, which the left-eye-side virtual image formation section allows the user to visually recognize, in a range outside the vision of the user when the user moves the line of sight rightward. In this case, the user can recognize necessary image information when required and remove unnecessary information out of the vision.

A second aspect of the invention is directed to a virtual image display apparatus including: (a) an image processing section that processes an image signal that allows a user to visually recognize a virtual image in accordance with an input signal, (b) a video image generation section that generates light that allows the user to visually recognize the virtual image in accordance with the image signal from the image processing section, and (c) a virtual image formation section that allows the user to visually recognize the light from the video image generation section in the form of the virtual image displayed in an imaginary video image area, (d) when the video image generation section generates the light and the virtual image formation section allows the user to visually recognize the light from the video image generation section in the form of the virtual image, trapezoidal distortion is produced at least in one of horizontal and vertical directions, (e) the image processing section includes a trapezoidal correction processing portion that performs trapezoidal correction on the virtual image to be recognized by the user, (f) the virtual image formation section is formed of a pair of a right-eye-side virtual image formation section and a left-eye-side virtual image formation section that correspond to the right and left eyes respectively, and (g) the trapezoidal correction processing portion performs trapezoidal correction on the right-eye-side virtual image formation section and trapezoidal correction on the left-eye-side virtual image formation section in a mirror symmetric manner with respect to an axis of symmetry in a rightward/leftward direction.

In the virtual image display apparatus described above, the virtual image formation section is formed of the pair of right-eye-side virtual image formation section and left-eye-side virtual image formation section, and the trapezoidal correction processing portion performs trapezoidal correction on the two virtual image formation sections in a mirror symmetric manner, whereby the correction is well balanced in the rightward/leftward direction, and the correction burden can be reduced as compared with a case where correction is separately performed on the right and left sides. Further, in this case, since the right and left sides have the same but only reversed configurations, the amount of correction can be reduced as compared, for example, with a case where correction is performed individually on the right and left sides and video images in the right and left video image areas are so aligned with each other on a pixel basis that they can be recognized as common video images.

In a specific aspect of the invention, the image processing section divides the video image area, which the virtual image formation section allows the user to visually recognize, into a plurality of divided video image areas and processes the image signal in such a way that the divided video image areas include a first video image area that is located in an inner position and a second video image area that is located in an outer position. The image processing section processes the image signal in such a way that the first video image area of the video image area that the right-eye-side virtual image formation section allows the user to visually recognize includes a right-eye-side first video image area and the second video image area of the video image area that the right-eye-side virtual image formation section allows the user to visually recognize includes a right-eye-side second video image area. The image processing section processes the image signal in such a way that the first video image area of the video image area that the left-eye-side virtual image formation section allows the user to visually recognize includes a left-eye-side first video image area and the second video image area of the video image area that the left-eye-side virtual image formation section allows the user to visually recognize includes a left-eye-side second video image area. The image processing section displays video images common to the right and left sides in the right-eye-side first video image area and the left-eye-side first video image area. In this case, video images can be so displayed that a central image can be formed of a single common image recognizable with the right and left eyes, whereas the right-eye-side second video image area and the left-eye-side second video image area can display images different from the single common image described above.

A third aspect of the invention is directed to a virtual image display apparatus including: (a) an image processing section that processes an image signal that allows a user to visually recognize a virtual image in accordance with an input signal, (b) a video image generation section that generates light that allows the user to visually recognize the virtual image in accordance with the image signal from the image processing section, and (c) a virtual image formation section that allows the user to visually recognize the light from the video image generation section in the form of the virtual image displayed in an imaginary video image area, (d) when the video image generation section generates the light and the virtual image formation section allows the user to visually recognize the light from the video image generation section in the form of the virtual image, trapezoidal distortion is produced at least in one of horizontal and vertical directions, (e) the image processing section includes a trapezoidal correction processing portion that performs trapezoidal correction on the virtual image to be recognized by the user, and (f) in the virtual image formation section, a center position of the video image area is shifted from a center position of an eye of the user who wears the apparatus.

In the virtual image display apparatus described above, a center position of the video image area in the virtual image formation section is shifted from a center position of an eye of the user who wears the apparatus. In this case, for example, the shift can, for example, be so made that the center position of the eye coincides with the center position of the area where a distortion-free image can be formed by using a small amount of correction. As a result, in an area where the user tends to pay attention, the size of an unused, waste area can be reduced and the size of the video image area to be used can be increased. Further, the area outside the area where the user tends to pay attention can also be used as a portion that provides video images.

In a specific aspect of the invention, the image processing section divides the video image area, which the virtual image formation section allows the user to visually recognize, into a plurality of divided video image areas and processes the image signal in such a way that the divided video image areas include a first video image area that is located in an inner position and a second video image area that is located in an outer position, and a center position of the first video image area of the video image area coincides with a center position of the eye of the user who wears the apparatus. In this case, video images in the first video image area can be recognized as those at the center where central vision occurs, whereas video images in the second video image area can be recognized as those at the periphery.

In another aspect of the invention, the video image generation section and/or the virtual image formation section produces at least horizontal trapezoidal distortion. In this case, for example, the horizontal trapezoidal distortion is produced when light is obliquely projected sideways from the side where the nose or the ear of the user who wears the apparatus is present and the virtual image is formed, but image formation can be performed with the distortion corrected.

In still another aspect of the invention, the video image generation section includes a signal light modulator that outputs signal light modulated in correspondence with an image and a scan system that causes the signal light incident from the signal light modulator to undergo a scan process and outputs the resultant light as scan light. In this case, for example, the size of the video image generation section can be reduced.

BRIEF DESCRIPTION OF THE DRAWINGS

The invention will be described with reference to the accompanying drawings, wherein like numbers reference like elements.

FIG. 33 shows the light output section shown in FIG. 3A but viewed in another direction.

DESCRIPTION OF EXEMPLARY EMBODIMENTS

First Embodiment

A virtual image display apparatus according to a first embodiment of the invention will be described below in detail with reference to the drawings.

Figure 1:
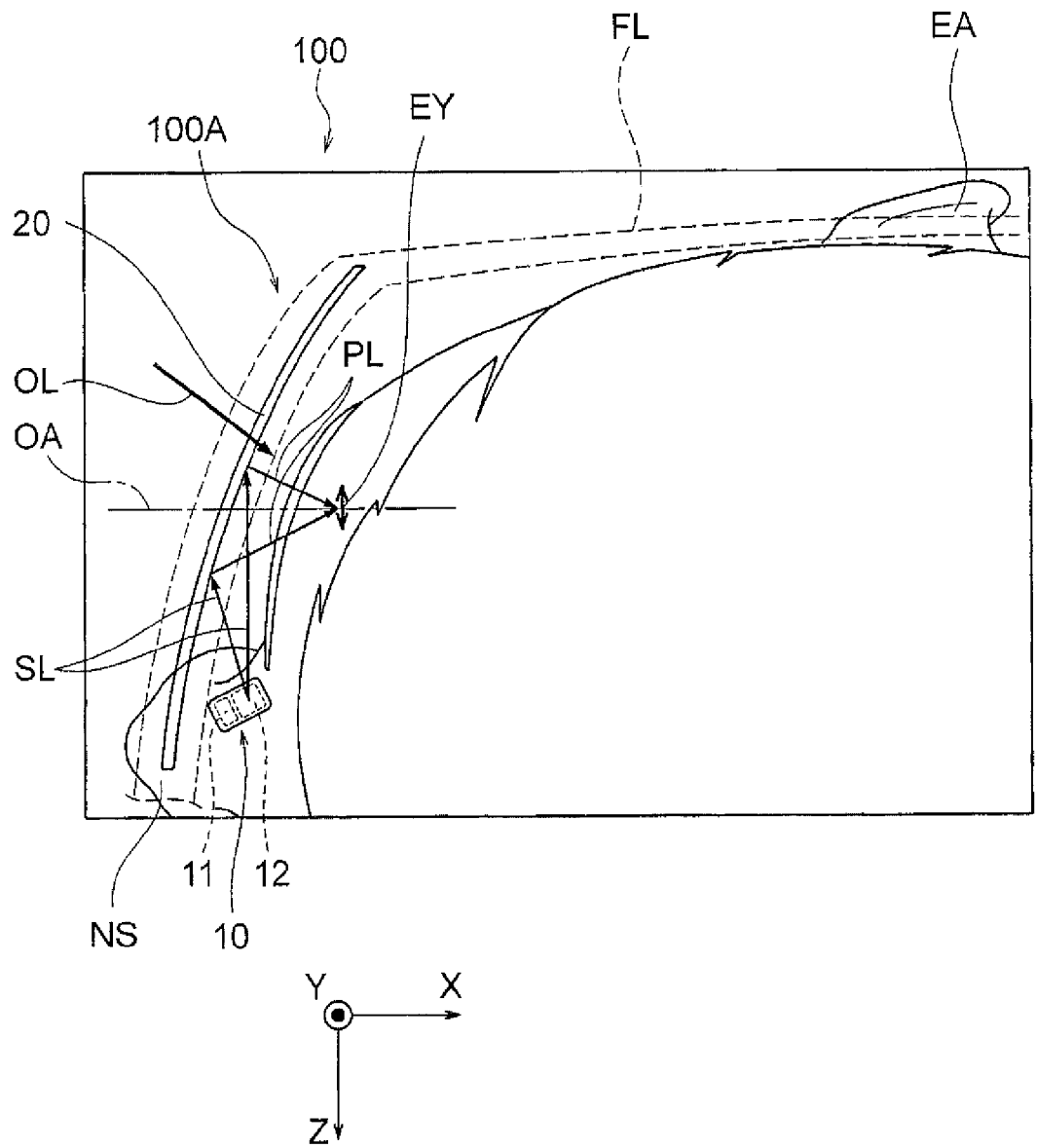
FIG. 1 shows a virtual image display apparatus according to a first embodiment.

A virtual image display apparatus 100 according to the embodiment shown in FIG. 1, which is a head-mounted display having a spectacle-like external appearance, not only allows a wearer (user), a viewer who wears the virtual image display apparatus 100, to recognize image light corresponding to a virtual image but also allows the wearer, the user of the virtual image display apparatus 100, to view an image formed by outside light in see-through observation. FIG. 1 is a partial enlarged view showing a state in which the wearer wears the virtual image display apparatus 100, and part of the virtual image display apparatus 100 is omitted. Specifically, a first display unit 100A is part of the virtual image display apparatus 100 and forms a virtual image on the right-eye side. In the virtual image display apparatus 100, the first display unit 100A on the right-eye side is paired with a second display unit 100E on the left-eye side, as schematically shown, for example, in FIG. 2, but the second display unit 100B will not be described in detail because it has the same structure as that of the first display unit 100A and is simply a horizontally reversed version of the first display unit 100A. The first display unit 100A functions by itself as a virtual image display apparatus.

In the state shown in FIG. 1 and other figures, the direction oriented exactly frontward from the wearer is the direction of an optical axis OA, and X, Y, and Z directions are defined as follows: a +X direction is the direction in which the optical axis OA extends from the virtual image display apparatus 100 toward the wearer; ±Y directions are the upward and downward directions with respect to the wearer; and ±Z directions are the leftward and rightward directions with respect to the wearer.

An example of the structure of the virtual image display apparatus 100 will be described below by describing an example of the structure of the first display unit 100A. The first display unit 100A includes a light output section 10, which forms signal light and outputs the signal light in the form of scan light SL, and a virtual image formation section 20, which is an irradiated member that receives the scan light SL from the light output section 10 to form image light PL, as shown in FIG. 1. The light output section 10 is disposed in the vicinity of the wearer's nose NS, and the virtual image formation section 20 is disposed in front of the light output section 10 (on −X side) and covers an area in front of and corresponding to the wearer's eye EY.

Figure 2:
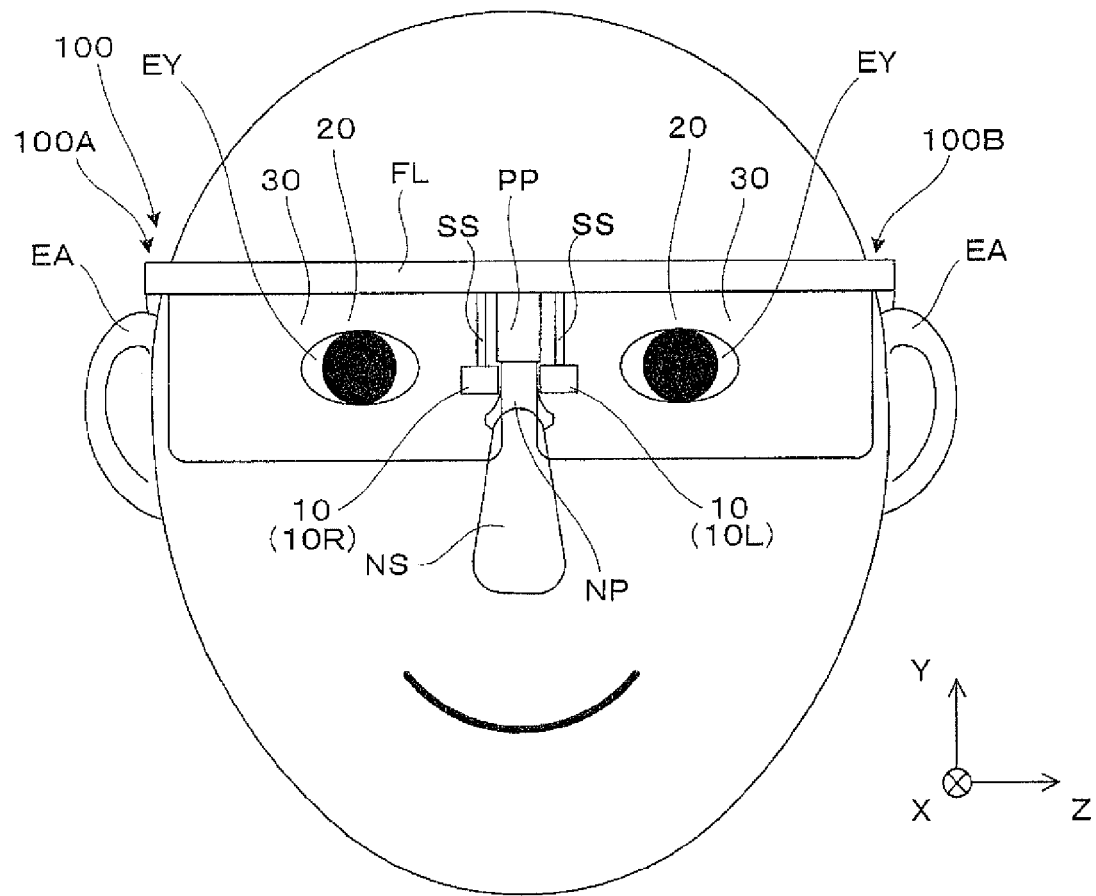
FIG. 2 is a front view schematically showing a state in which the virtual image display apparatus is worn.

In FIG. 2, which is a front view schematically showing a state in which the virtual image display apparatus 100 is worn, the light output section 10 is so supported by a support SS extending from a frame FL that the light output section 10 is disposed in a position in the vicinity of the nose NS on the +X side of the virtual image formation section 20 as described above. In the example shown in FIG. 2, the virtual image display apparatus 100 includes a pillar PP, which extends from a central portion of the frame FL and supports the virtual image formation section 20 in a sideways direction, and a nose pad NP, which is disposed at an end of the pillar PP and allows the nose NS to support the virtual image display apparatus 100 worn by the wearer. The light output section 10 is formed of a light output section 10R for the right eye and a light output section 10L for the left eye, as shown in FIG. 2.

Figure 3A:
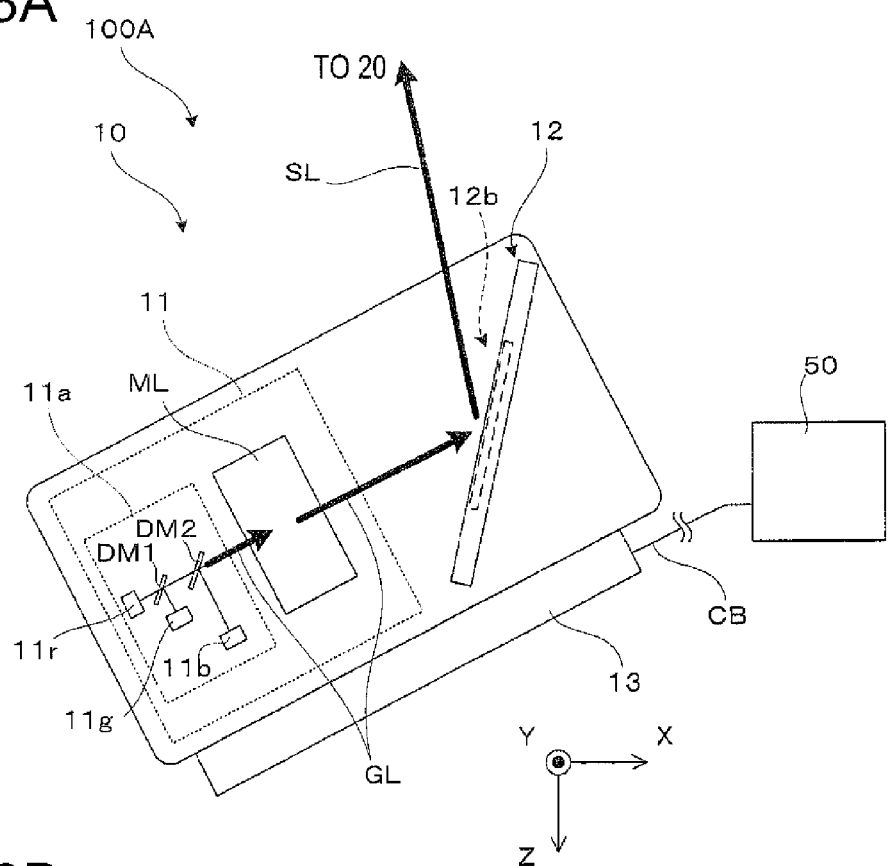
FIG. 3A describes an example of the structure of a light output section.
Figure 3B:
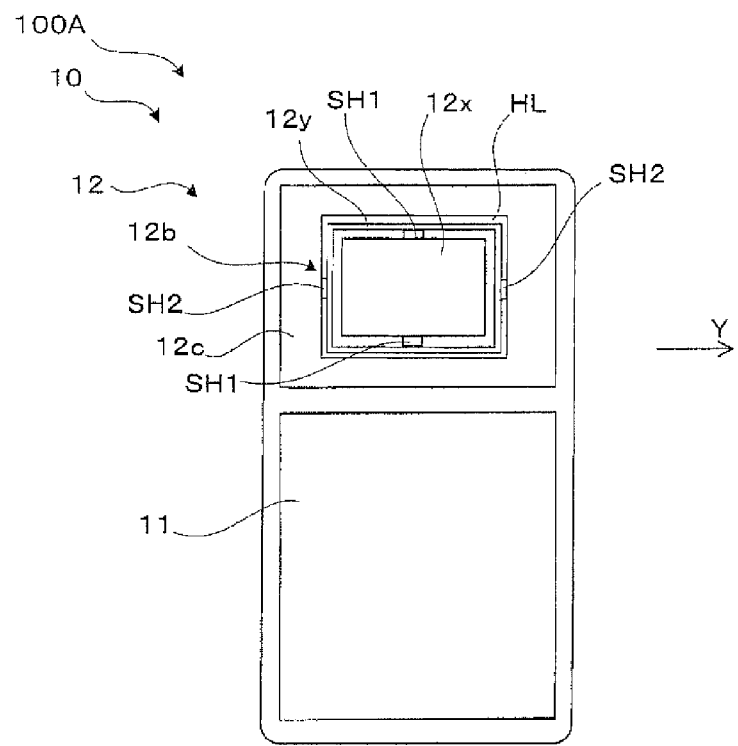

The light output section 10 is a video image generation section including a signal light modulator 11, which is a signal light formation portion, a scan system 12, and a drive control circuit 13, as shown in FIGS. 3A and 3B. The virtual image display apparatus 100 further includes a controller 50 for controlling image formation, as shown in FIG. 3A. The controller 50 is connected to the light output section 10 via a cable CB. The controller 50 will be described later in detail.

The light output section 10 serves as the video image generation section that generates light for forming a virtual image by outputting light for image formation in accordance with an image signal among a variety of signals from the controller 50. Among the components of the light output section 10, the drive control circuit 13 drives and controls the light output section 10 in accordance with the image signal and a drive signal sent from the controller 50. That is, the drive control circuit 13 is a control circuit for driving the signal light modulator 11 and the scan system 12 in synchronization with each other in accordance with a variety of signals.

The configuration and action of the light output section 10 will be described below in detail. The signal light modulator 11 includes a combined light formation portion 11a and a collimator lens ML. The combined light formation portion 11a forms combined light that is signal light GL, which will form the image light PL (see FIG. 1). To this end, the combined light formation portion 11a includes color light sources 11r, 11g, and 11b, which emit red (R light), green (G light), and blue (B light) color light fluxes respectively, and first and second dichroic mirrors DM1, DM2, which combine the color light fluxes emitted from the color light sources 11r, 11g, and 11b. The collimator lens ML is a lens that adjusts the light flux state of the signal light GL, which is the combined light having exited out of the combined light formation portion 11a, to modulate the signal light GL and outputs the modulated signal light GL toward the scan system 12. The collimator lens ML, for example, substantially parallelizes the signal light GL. The scan system 12 includes a MEMS mirror 12b, which is a scanner that two-dimensionally scans the virtual image formation section 20 with the signal light GL having exited out of the collimator lens ML.

In the signal light modulator 11 among the components of the light output section 10, each of the color light sources 11r, 11g, and 11b is a diode laser light source or an LED light source. The red light source 11r emits light of a specific wavelength band that produces red light. The green light source 11g emits light of a specific wavelength band that produces green light. The blue light source 11b emits light of a specific wavelength band that produces blue light. Each of the color light sources 11r, 11g, and 11b is, for example, formed of an LED-type light emitting device that emits the corresponding color light flux. Each of the color light sources 11r, 11g, and 11b emits the corresponding color light flux with the direction of the light flux so adjusted that the light flux travels toward the first dichroic mirror DM1 or the second dichroic mirror DM2.

The first dichroic mirror DM1 transmits light of the specific wavelength band that produces red light and reflects light of the other specific wavelength bands, and the second dichroic mirror DM2 transmits light of the specific wavelength bands that produce red and green light and reflects light of the other specific wavelength band. The combined light, which is the combination of the three color light fluxes, the red light, the green light, and the blue light, is thus formed as the signal light GL, which will form a color image. In the case shown in FIG. 3A, the positions of the color light sources 11r, 11g, and 11b are so adjusted that the optical path lengths of the three color light fluxes to be combined are equal to one another. That is, the color light fluxes are equivalently positioned. Further, the size of the second dichroic mirror DM2 with respect to the size of the first dichroic mirror DM1 is also adjusted in accordance with the shape of each of the light fluxes.

Using the color light sources 11r, 11g, and 11b corresponding to the three colors, red (R light), green (G light), and blue (B light), to perform the combined light formation in the thus configured combined light formation portion 11a contributes to high light usage efficiency.

The collimator lens ML adjusts the angle of divergence of the signal light GL, which is the combined light formed by the combined light formation portion 11a, for example, converts the light flux into a substantially parallelized but slightly convergent light flux, and outputs the resultant signal light GL toward the MEMS mirror 12b, which is a scanner, in the scan system 12.

The scan system 12 includes the MEMS mirror 12b and a peripheral member 12c, as shown in FIG. 3B. The MEMS mirror 12b irradiates an irradiated area of the virtual image formation section 20 (see FIG. 1), which is the irradiated member, with the signal light GL having passed through the collimator lens ML in the form of the scan light SL to allow visual recognition of an image in the form of a virtual image. That is, the MEMS mirror 12b is a key portion of the scan system 12. The peripheral member 12c forms a hole HL, which surrounds the periphery of the MEMS mirror 12b to accommodate the MEMS mirror 12b. In other words, the MEMS mirror 12b is accommodated in the hole HL having a rectangular shape and provided in a central portion of the scan system 12. The MEMS mirror 12b can be inclined in an arbitrary direction.

The MEMS mirror 12b will be described below in detail. The MEMS mirror 12b is a scanner that outputs the signal light GL, which is the combined light formed by the signal light modulator 11, in the form of the scan light SL, with which the virtual image formation section 20 (see FIG. 1) is irradiated and two-dimensionally scanned. The MEMS mirror 12b is formed of a MEMS mirror main body 12x rotatable around a single axis and a mirror frame 12y surrounding the MEMS mirror main body 12x and rotatable around an axis perpendicular to the single axis in order to be capable of two-dimensional scanning. First, the MEMS mirror main body 12x has a pair of first shafts SH1 connected to the mirror frame 12y and is rotatable around the first shafts SH1. The mirror frame 12y has a pair of second shafts SH2 connected to the peripheral member 12c of the MEMS mirror 12b and is rotatable around the second shafts SH2. Since the axial direction of the first shafts SH1 and the axial direction of the second shafts SH2 are perpendicular to each other, the MEMS mirror main body 12x of the MEMS mirror 12b is rotatable around the two axes perpendicular to each other. The thus configured MEMS mirror 12b can be inclined in an arbitrary direction and allows two-dimensional scanning of a target object with the scan light SL, which is a beam to be outputted. That is, the MEMS mirror 12b is a MEMS scanner that irradiates the virtual image formation section 20 with the scan light SL.

It is noted that a relay lens for adjusting the angle of divergence of the light flux can be disposed on the light exiting side of the MEMS mirror 12b.

Referring back to FIG. 1, the virtual image formation section 20 is a transparent base member having a semi-transparent/semi-reflective film formed on a transparent substrate made of a resin. That is, the virtual image formation section 20 is a half-silvered mirror. The virtual image formation section 20 is assembled to the frame FL and disposed in a position in front of the wearer's eye EY and farther away from the wearer than the light output section 10. In other words, the light output section 10 is disposed between the wearer's eye EY and the virtual image formation section 20 in the direction along the optical axis OA. The virtual image formation section 20 has a size large enough to cover the wearer's eye EY from the front side, receives the scan light SL outputted from the scan system 12 in the light output section 10 and inclined toward the −X direction, reflects the scan light SL to form a virtual image, which is recognized by the wearer. The virtual image formation section 20 has a shape that follows the exterior appearance of the virtual image display apparatus 100 and is curved in accordance with the frame FL in the example shown in FIG. 1.

Further, the virtual image formation section 20, which is a half-silvered mirror, is a plate-shaped member having a substantially uniform thickness, not only forms a virtual image as described above and allows visual recognition of the virtual image but also transmits outside light OL. That is, not only the virtual image but also light from the outside reach the wearer's eye EY, which means that the virtual image display apparatus 100 has a see-through configuration.

In the configuration described above, the light output section 10 outputs light toward the virtual image formation section 20 in the form of oblique projection. An image formed on the virtual image formation section 20, if no correction is made on the image, is distorted, for example, in the form of horizontal trapezoidal distortion. More specifically, the light projection onto the virtual image formation section 20 is inclined to the horizontal direction (Z direction) and produces distortion at least in one of the vertical direction (Y direction) and the horizontal direction (Z direction), specifically, in the horizontal direction. The way in which the light output section 10 performs the scanning, the shape of the virtual image formation section 20 curved in accordance with the exterior appearance of the virtual image display apparatus 100, and other factors contribute to distortion generation. In the present embodiment, an image is corrected by performing distortion correction (trapezoidal correction) in advance in accordance with distortion produced in the image in a trapezoidal correction process that is an example of image processing performed by the controller 50.

Further, in general, when trapezoidal correction and other types of distortion correction are performed, a greater amount of correction results in a smaller displayed image, lower resolution, and a larger unused, waste area. The amount of correction is therefore desirably small in a head-mounted display in which its resolution tends to be severely limited due particularly to demands for reduction in size and weight of the apparatus, such as the virtual image display apparatus 100. In contrast, in the present embodiment, to perform distortion correction on an image, the image is divided into a plurality of areas so that the amount of correction in each of the divided areas is reduced and an unused, waste area is minimized. A wide video image area effectively used to display a distortion-free image can thus be achieved.

Figure 4:
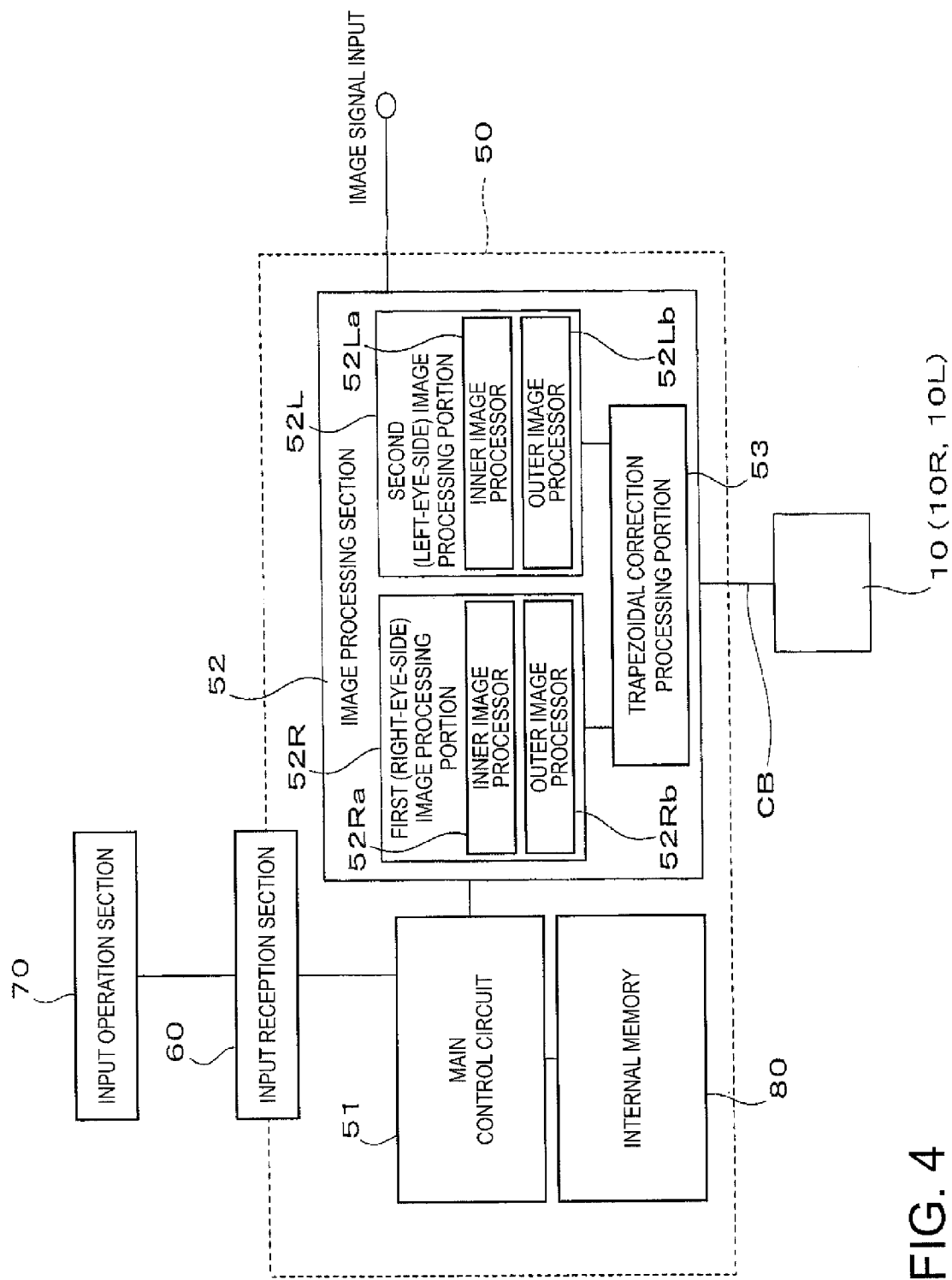
FIG. 4 is a block diagram for describing the structure of a controller in the virtual image display apparatus.

The structure of the controller 50 including a trapezoidal correction portion and action of image processing will be described below with reference to FIG. 4. The controller 50 includes a main control circuit 51, which oversees and controls the action of the controller 50, an image processing section 52, which performs image processing based on an externally inputted image signal, such as a video signal, an input reception section 60, which receives an external signal, such as an instruction from the wearer (operator), and an internal memory 80, which saves a variety of data on video images having fixed contents, such as icons. The controller 50 is disposed in a position where the controller 50 does not block the vision of the wearer, for example, by accommodating the cable CB in the frame FL, the support SS, and other components shown in FIG. 2 and extending the cable CB.

The image processing section 52 creates a variety of signals related to images and audio based, for example, on an externally inputted signal and sends the created signals to the light output section 10 (10R and 10L) via the cable CB. That is, the variety of signals related to images and audio are transmitted from the image processing section 52 to the drive control circuit 13 (see FIG. 3A) in the light output section 10. To form an image in the form of a virtual image to be recognized, the image processing section 52 includes a first image processing portion 52R, a second image processing portion 52L, and a trapezoidal correction processing portion 53 for trapezoidal correction. In particular, having the trapezoidal correction processing portion 53, the image processing section 52 can perform a variety of types of correction.

Among the components of the image processing section 52, the first image processing portion 52R processes an image to be visually recognized as an image on the right-eye side. On the other hand, the second image processing portion 52L processes an image to be visually recognized as an image on the left-eye side. In the present embodiment, the first image processing portion 52R and the second image processing portion 52L separately perform image processing, whereby images displayed on the right-eye and left-eye sides can be projected over different ranges and show different contents (detailed description will be made later with reference to FIG. 7A and other figures). Each of an image on the right-eye side and an image on the left-eye side is formed of a plurality of divided images, an inner image (on nose side) and an outer image (on ear side). Each of the first image processing portion 52R and the second image processing portion 52L forms divided images corresponding to the images divided as described above. That is, the first (right-eye-side) image processing portion 52R is formed of an inner image processor 52Ra and an outer image processor 52Rb, and the second (left-eye-side) image processing portion 52L is formed of an inner image processor 52La and an outer image processor 52Lb.

The trapezoidal correction processing portion 53, on the other hand, performs trapezoidal correction on an image on the right-eye side and an image on the left-eye side together.

The input reception section 60 receives an external signal from the wearer (operator) via an input operation section 70.

The internal memory 80 stores part of the contents of images to be projected, that is, a variety of data on video images having fixed contents, such as icons, dates, and a watch.

The main control circuit 51 performs, as an example of the centralized control on the action of the controller 50, a variety of processes according, for example, to a signal received by the input reception section 60. Among a variety of received signals, when recognizing a signal related, for example, to image processing, the main control circuit 51 transmits the signal to the image processing section 52. Further, the main control circuit 51 reads as required or as appropriate part of information that will form image signals to be sent from the image processing portions 52R and 52L, that is, information contained in the variety of data stored in the internal memory 80 and transmits the information to the image processing section 52.

Figure 5:
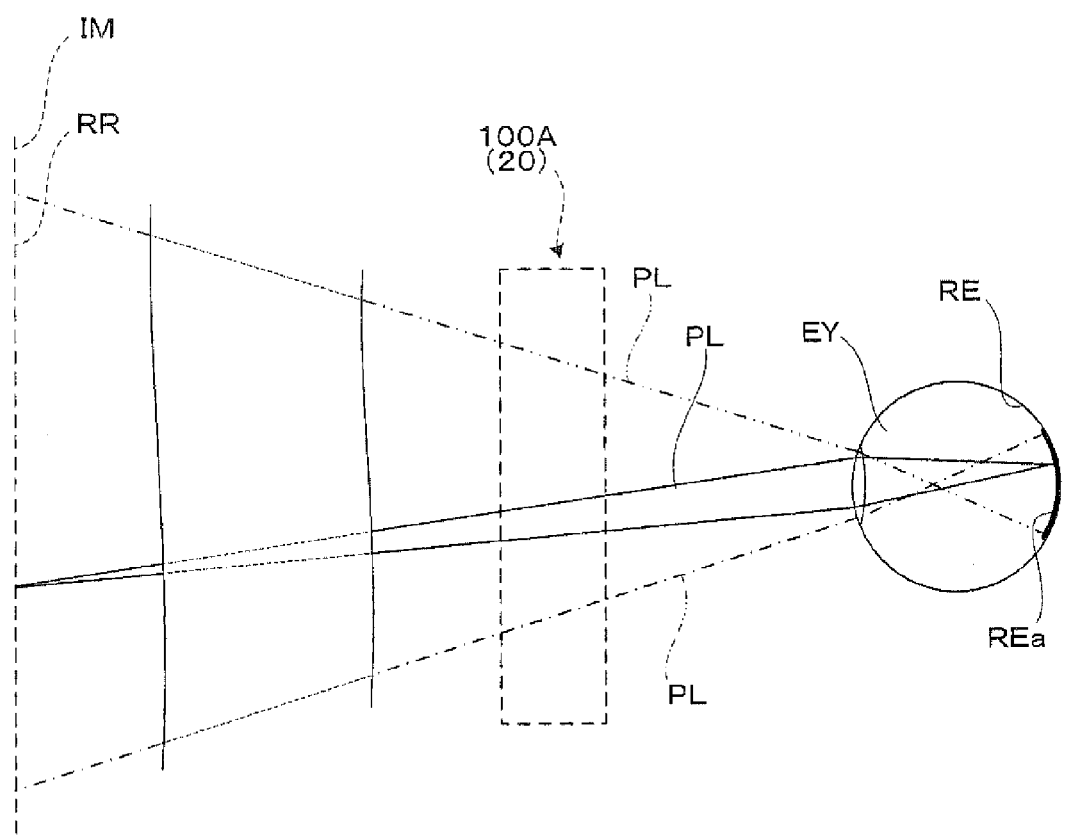
FIG. 5 is a conceptual diagram showing a video image area visually recognized when image light is incident.

A description will next be made of an image visually recognized when the image light PL having exited out of the virtual image formation section 20 in the first display unit 100A is incident on the wearer's eye EY with reference to FIG. 5. FIG. 5 is a conceptual diagram for describing the relationship between the image light PL incident on the retina RE of the eye EY and a video image area RR, which is an imaginary area that defines the range of a virtual image visually recognized as an image on an imaginary plane IM visually recognized by the wearer who observes the image light PL. In particular, in FIG. 5, the image light PL is conceptually shown for ease of illustration.

It is assumed in FIG. 5 that the imaginary plane IM is an imaginary plane positioned at infinity and that an area REa is the portion of the retina RE of the wearer's eye EY on which the image light PL is incident. The area REa corresponds to an image formation plane and is conjugate to the video image area RR in the imaginary plane IM. The conjugate relationship means that the image formation plane in the area REa of the retina RE corresponds to the plane of the video image area RR in a one-to-one relationship. When the wearer, specifically, the area REa of the retinal RE receives the image light FL having exited out of the virtual image formation section 20, the wearer recognizes (visually recognizes) that an image in the form of a virtual image is present in the video image area RR, which is located in a position on an extension that travels back along the optical path of the image light PL. In other words, the first display unit 100A allows the wearer to visually recognize the image light PL as if an image were formed in the video image area RR. That is, the first display unit 100A functions as a virtual image display apparatus by controlling the image light FL that exits out of the virtual image formation section 20 based, for example, on processes carried out on the image formation side to adjust the video image area RR to be visually recognized by the wearer into a desired state.

A description will next be made of an example of the image area division and the distortion correction performed by the image processing section 52 with reference to FIG. 6A and other figures. In the following description, the video image area RR and portions produced by dividing the video image area RR (first video image area RR1 shown in FIG. 6A, for example) are, in reality, the image light FL, which is focused on the area REa of the retinal RE in FIG. 5. However, an image formed by the image light PL is captured by the wearer as an image in the video image area RR, and the area REa and the video image area RR are conjugate to each other, as described above. The following description will therefore be made assuming that an image focused on the area REa and visually recognized by the wearer is an image in the video image area RR.

Figure 6A:
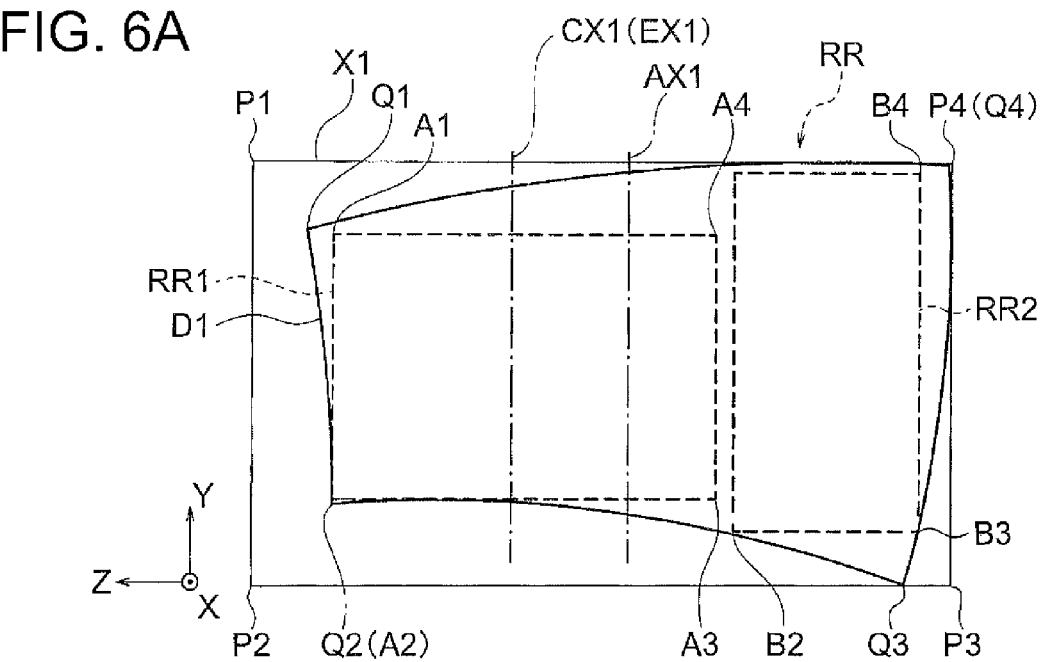
FIG. 6A shows a video image area on the right-eye side, and FIG. 6B describes trapezoidal correction performed to achieve the state shown in FIG. 6A.
Figure 6B:
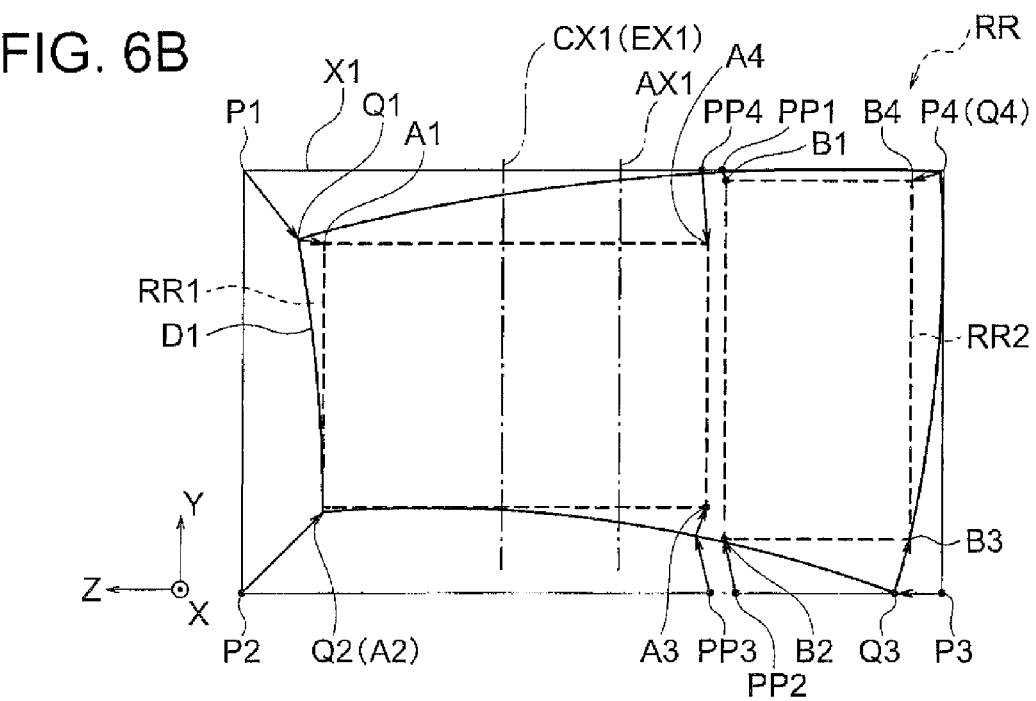

First, FIG. 6A is a diagram conceptually showing the video image area RR formed on the side where one of the right and left eyes, the right eye, is present, that is, in the first display unit 100A, and FIG. 6B describes correction of distortion (trapezoidal correction) in an image performed by the trapezoidal correction processing portion 53 (see FIG. 4) to achieve the state shown in FIG. 6A. It is assumed in the description that the video image area RR is formed of two rectangular divided areas, a first video image area RR1 and a second video image area RR2, as shown in FIG. 6A.

In FIG. 6A, an area X1 schematically shows an image having a rectangular area based on original image data recognized by the controller 50, which includes the image processing section 52 (first image processing portion 52R). On the other hand, an area D1 shows an entire displayable area (area incident on eye EY) on the virtual image formation section 20 in a case where no distortion correction is performed. That is, when original image data or an image having a rectangular shape with pixels arranged in a matrix is projected with no correction, the projected image has a fan-like shape spreading outward, as indicated by the area D1, on the virtual image formation section 20. In the present embodiment, distortion correction is so performed by the trapezoidal correction processing portion 53 on the range indicated by the area D1 that part of the area D1 is not used and the video image areas RR1 and RR2, which are a plurality of divided video image areas that are formed of a plurality of rectangular areas and form the video image area RR, have rectangular shapes.

Further, as shown in FIG. 6A, in the video image area RR, the first video image area RR1 is disposed on the inner side (nose side) relative to the second video image area RR2, and the second video image area RR2 is disposed on the outer side (ear side) relative to the first video image area RR1. In other words, the video image areas RR1 and RR2 are arranged in the horizontal direction (Z direction). When image projection is performed from the nose side (see FIG. 2) as in the present embodiment, the area D1 is so distorted that the amount of distortion on the inner side (nose side) is relatively small and the amount of distortion on the outer side (ear side) is relatively large in the horizontal direction (Z direction) in particular. In view of the fact described above, the second video image area RR2, which is the outer video image area where the amount of distortion is relatively large due to reduction in the amount of distortion correction as a whole, has a rectangular shape that is short in the horizontal direction and long in the vertical direction. On the other hand, the first video image area RR1, which is the inner video image area where the amount of distortion is relatively small, has a horizontally elongated rectangular shape having an aspect ratio of 16:9. The trapezoidal correction processing portion 53 therefore performs different types of correction on the first video image area RR1 and the second video image area RR2 in correspondence with the fact that the two areas have different rectangular shapes.

A description will next be made of correction of distortion in video images performed on the divided images based on trapezoidal correction with reference to FIG. 6B. It is noted that the overall distortion correction will be described by describing coordinate conversion performed on pixels at the four corners among the pixels in original image data that defines the rectangular area. Specifically, let pixels P1 to P4 be the pixels at the four corners of the area X1 corresponding to the original image data, and let pixels Q1 to Q4 be the pixels in the area D1 that correspond to the pixels P1 to P4. Further, in the video image area RR, let pixels A1 to A4 be the pixels at the four corners of the first video image area RR1, and let pixels B1 to B4 be the pixels at the four corners of the second video image area RR2. In this case, in video images formed in the first video image area RR1, for example, the pixel P1 at the upper left corner among the pixels in the area X1 corresponds to the pixel Q1 in the area D1, and the pixel Q1 in the area D1 further corresponds to the pixel A1 in the first video image area RR1. That is, desired conversion can be made by performing correction in such a way that image data at the coordinates of the position of the pixel P1 is converted into image data at the coordinates of the position of the pixel A1. Similarly, information on the pixel P2 at the lower left corner may be related to information in the position of the pixel A2 based on the coordinate conversion. Further, the pixel A3 at the lower right corner in the first video image area RR1 may be related to a pixel PP3 on the line segment connecting the pixel P2 and the pixel P3 in the area X1 to each other, and the pixel A4 at the upper right corner may be related to a pixel PP4 on the line segment connecting the pixel P1 and the pixel P4 in the area X1 to each other.

Coordinate conversion can be similarly performed as described above on the pixels B1 to B4, which are the pixels at the four corners of the second video image area RR2, for distortion correction. Specifically, the pixel B1 at the upper left corner may be related to a pixel PP1 on the line segment connecting the pixel P1 and the pixel P4 in the area X1 to each other, and the pixel B2 at the lower left corner may be related to a pixel PP2 on the line segment connecting the pixel P2 and the pixel P3 in the area X1 to each other. Further, the pixel B3 at the lower right corner may be related to the pixel P3 among the pixels in the area X1, and the pixel B4 at the upper right corner may be related to the pixel P4 among the pixels in the area X1.

As described above, the trapezoidal correction processing portion 53 separately performs correction on the first video image area RR1 and correction on the second video image area RR2, whereby distortion-free images can be formed in the first video image area RR1 and the second video image area RR2, each of which is a rectangular area.

The area D1 has a fan-like shape horizontally elongated and spreading outward (toward ear) as compared with the original rectangular area X1, and the amount of distortion is greater in a position closer to the outer periphery at least in the horizontal direction, as described above. From a different point of view, an inner (nose-side) area of the area D1 is relatively close to a rectangular shape. That is, in the first video image area RR1 located relatively on the inner side in the video image area RR, desired distortion correction is achieved based on a relatively small amount of correction even when the first video image area RR1 is horizontally elongated, and the amount of correction can be reduced even when the first video image area RR1 is relatively large. In view of the fact described above, the first video image area RR1 is an area where a horizontally elongated primary video images are formed, and the second video image area RR2 is an area where vertically elongated secondary video images are formed.

In FIGS. 6A and 6B, if the video image area RR is not divided into the two video image areas RR1 and RR2 described above, but the single video image area RR is handled as an entire screen, and a horizontally elongated rectangular area, such as the first video image area RR1, is formed from the area D1, forming an image, for example, having a vertical (Y-direction) resolution of 720 pixels requires that pre-correction original image data has a resolution of about 1300 pixels in accordance with the resolution compression in the outer portion of the first video image area RR. The necessary original resolution in the inner portion of the first video image area RR, where the amount of distortion is small and the resolution is maximized, is equal to the necessary resolution in the outer portion of the first video image area RR. In contrast, when correction is made only on a relatively inner area, such as the first video image area RR1, the amount of correction can be reduced, whereby video images having a resolution of 720 pixels can be formed based on original image data having a resolution of about 820 pixels. The amount of distortion correction necessary for the entire screen as a single image is about 1.5 to 2 times, whereas the overall amount of correction can be reduced to about 1.2 times by performing correction on divided areas as described above.

Further, the amount of correction in the second video image area RR2 can be reduced by using the remaining area that is not used as the first video image area RR1 as effectively as possible. Moreover, the distortion correction in the second video image area RR2 needs to be performed only in this area as described above, whereby the amount of correction can be further reduced.

Further, the second video image area RR2 can display video images having contents different from those of video images in the display area defined by the first video image area RR1. Among a variety of conceivable contents to be displayed, for example, movies, video images captured and recorded with a video camcorder, and other motion images can be displayed in the first video image area RR1, whereas a variety of pieces of information, such as captions for displayed images, and sound volume changing, pausing, fast-forwarding, and other instructions can be displayed in the second video image area RR2. Further, for example, an icon related to a certain action may be displayed in the second video image area RR2, and the wearer may operate the input operation section 70 (see FIG. 4) based on displayed information, whereby the wearer may intentionally select video images or any other images to be displayed in the first video image area RR1 based on an input signal sent from the input operation section 70 and received by the image processing section of the input reception section 60. That is, an intended image to be displayed may be formed in the first video image area RR1 and additional information may be formed in the second video image area RR2 for effective use of pixels and an increase in the amount of displayed information.

In the video image area RR, a variety of aspects of the positions of the divided first video image area RR1 and second video image area RR2 with respect to the position of the wearer's eye EY are conceivable. Among the variety of aspects, it is assumed in the description that the center EX1 of the wearer's eye EY coincides with the center CX1 of the first video image area RR1 rather than the center AX1 of the entire video image area RR as shown in FIGS. 6A and 6B. That is, in this case, the wearer recognizes video images displayed in the first video image area RR1 as primary video images displayed at the center, whereas recognizing video images displayed in the second video image area RR2 as secondary video images displayed at the periphery.

From a different point of view, the amount of correction in distortion correction can be reduced by forming the two video image areas RR1 and RR2 so divided that the center of video images is shifted from the center AX of the entire video image area as described above.

The virtual image display apparatus 100 may include a position adjustment mechanism (not shown) that allows alignment of the center EX1 of the eye EY and the center CX1 of the first video image area RR1 with each other described above, such as an interpupillary distance adjustment mechanism.

Figure 7A:
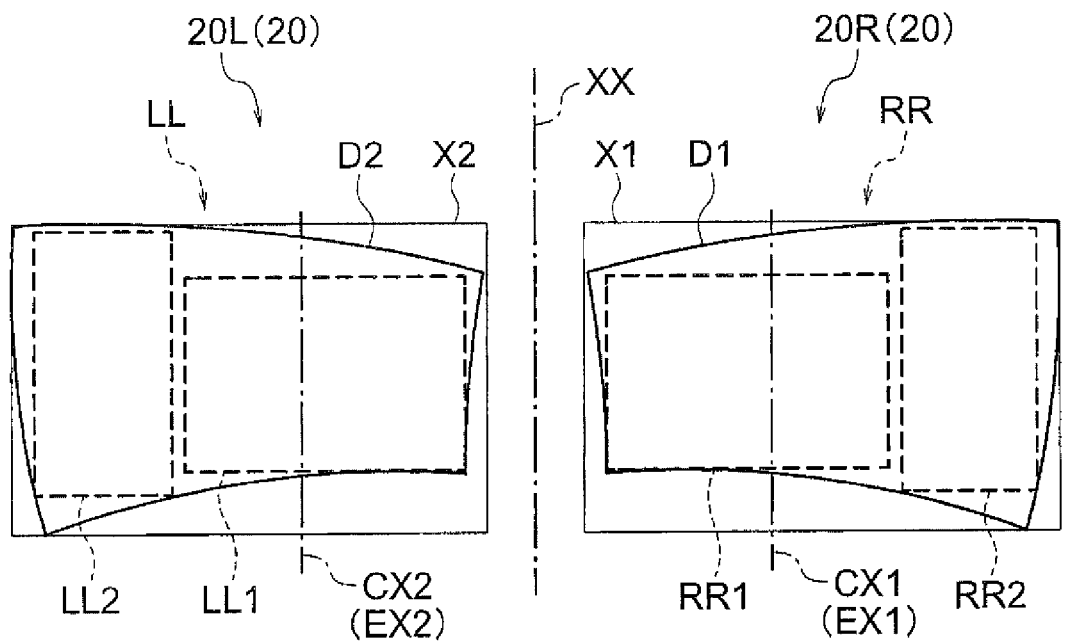
FIG. 7A shows a pair of right and left video image areas, and FIG. 7B conceptually shows images recognized by a user.

FIG. 7A shows a pair of right and left video image areas RR, LL. In the virtual image display apparatus 100, since the first display unit 100A and the second display unit 100B have the same but horizontally reversed structures as described above, the fan-like areas D1 and D2 are mirror symmetric with respect to an axis of symmetry XX in the rightward/leftward direction (Z direction). In correspondence with the thus shaped areas D1 and D2, the trapezoidal correction processing portion 53 performs trapezoidal correction on the video image area to be visually recognized via a virtual image formation section 20R on the right-eye side and trapezoidal correction on the video image area to be visually recognized via a virtual image formation section 20L on the left-eye side in a mirror symmetric manner with respect to the axis of symmetry XX. In the description, the first video image area RR1, which forms the right-eye-side portion of the video image area RR, is a right-eye-side first video image area, and the second video image area RR2 is a right-eye-side second video image area. Similarly, in the description, a first video image area LL1, which forms the left-eye portion of the video image area LL, is a left-eye-side first video image area, and a second video image area LL2 is a left-eye-side second video image area.

In the above description, the trapezoidal correction performed by the trapezoidal correction processing portion 53 can be performed in a substantially single process instead of being performed separately on the right and left sides because the produced trapezoidal distortion has mirror symmetry. Specifically, for example, correction in the first video image area RR1 on the right-eye side and correction in the first video image area LL1 on the left-eye side differ from each other in terms of image processing but can be performed in a substantially single process because the correction on the rectangular areas, that is, the coordinate conversion described with reference to FIG. 6B is inverse symmetric in the rightward/leftward direction. The same holds true for the relationship between the second video image area RR2 and the second video image area LL2. Individual image processing is required for the contents of video images in the plurality of divided first video image areas and second video image areas, whereas trapezoidal correction can be performed in a single process from the viewpoint of right-eye and left-eye sides. Therefore, the two first image processing portion 52R and second image processing portion 52L on the right and left sides are provided for the image processing, whereas the single trapezoidal correction processing portion 53 suffices for the trapezoidal correction. The trapezoidal correction processing portion 53 sends information on the coordinate conversion at each pixel determined as described above to the first and second image processing portions 52R, 52L, which determine image signals in consideration of not only the individual image processing but also the coordinate conversion, that is, the amount of trapezoidal correction from the trapezoidal correction processing portion 53 and send the image signals to the drive control circuit 13 (see FIG. 3A).

Figure 7B:
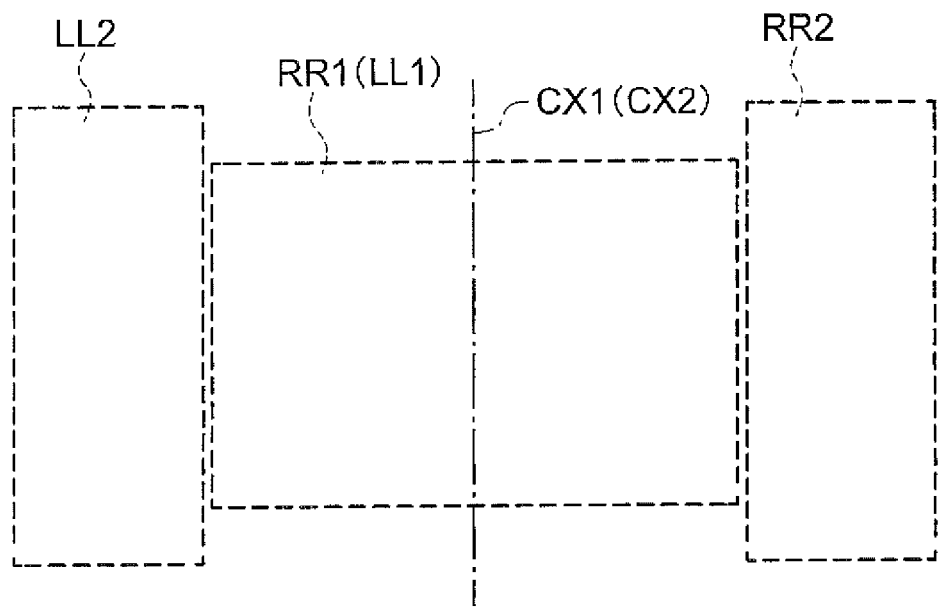

Images corresponding to the thus formed virtual images are so adjusted that the centers EX1 and EX2 of the eyes EY in the video image areas RR and LL coincide with the centers CX1 and CX2 of the first video image areas RR1 and LL1. The first video image area RR1 and the first video image area LL1 have the same number of pixels. In this case, when the same video images are displayed in the first video image area RR1 and the first video image area LL1, the wearer recognizes right and left images as a single common image. On the other hand, video images displayed in the second video image area RR2 and the second video image area LL2 are recognized as follows: The video images in the second video image area RR2 are recognized only with the right eye; and the video images in the second video image area LL2 are recognized only with the left eye. That is, as conceptually shown in FIG. 7B, when the wearer captures the images with both the eyes, the wearer recognizes that video images common to the first video image area RR1 and the first video image area LL1 are present as primary video images at the center and that right video images in the second video image area RR2 and left video images in the second video image area LL2 are present as secondary video images at the periphery.

In this case, the displayed common video images can, for example, be motion images as the primary video images, whereas the second video image areas RR2 and LL2 can display a variety of pieces of information. In particular, in this case, images formed in the second video image area RR2 and images formed in the second video image area LL2 can be separate from and independent of each other. Further, the common video imaged displayed in the first video image area RR1 and the first video image area LL1 can be 2D images that completely coincide with each other on a pixel basis or 3D images formed of common images shifted from each other in accordance with parallax between the right and left eye.

The image formation described above is achieved when each of the first image processing portion 52R and the second image processing portion 52L (see FIG. 4) performs image processing as appropriate. Specifically, the inner image processor 52Ra and 52La in the image processing portions 52R and 52L first perform image processing on central (inner-side), primary video images displayed in the first video image areas RR1 and LL1. For example, consider a case where image data, such as motion images, are handled. The image processing section 52 receives an externally inputted image signal, such as a video image signal, and the inner image processors 52Ra 52La perform image processing based on the signal. The outer image processors 52Rb and 52Lb in the image processing portions 52R and 52L then perform image processing on peripheral (outer-side), secondary video images displayed in the second video image areas RR2 and LL2. In this case, signals on a variety of data stored in the internal memory 80 are read as appropriate and transmitted to the image processing section 52, where the outer image processors 52Rb and 52Lb perform image processing based on the signals.

Figure 8A:
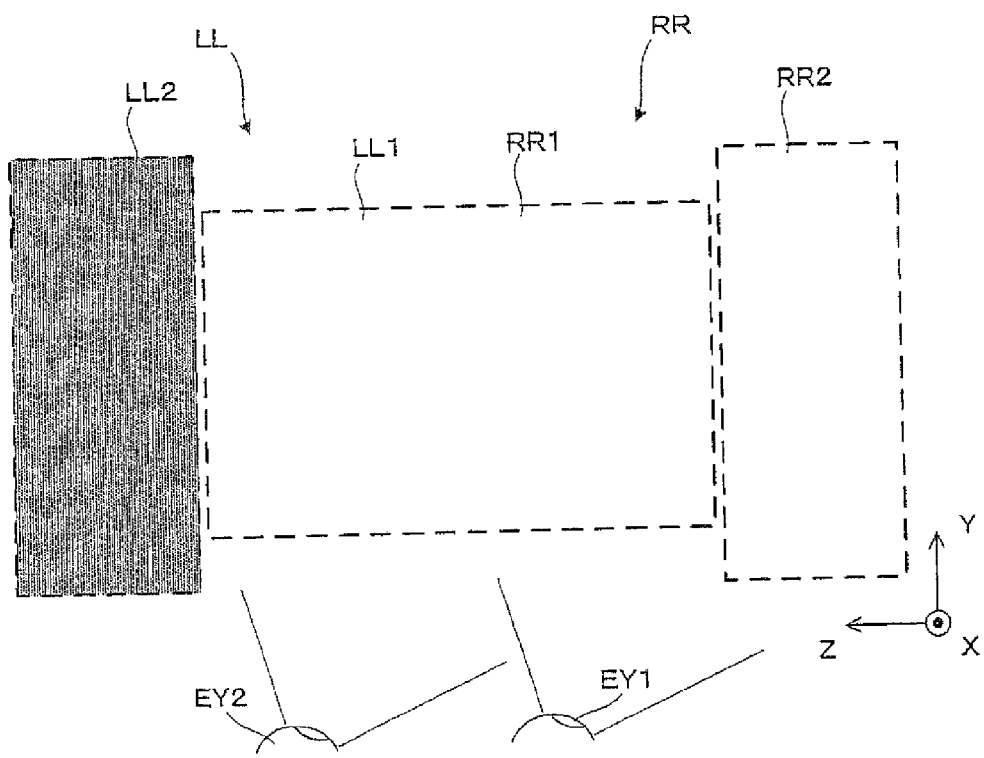
FIG. 8A shows the range of video images recognizable by the user when the user moves the eyes rightward.
Figure 8B:
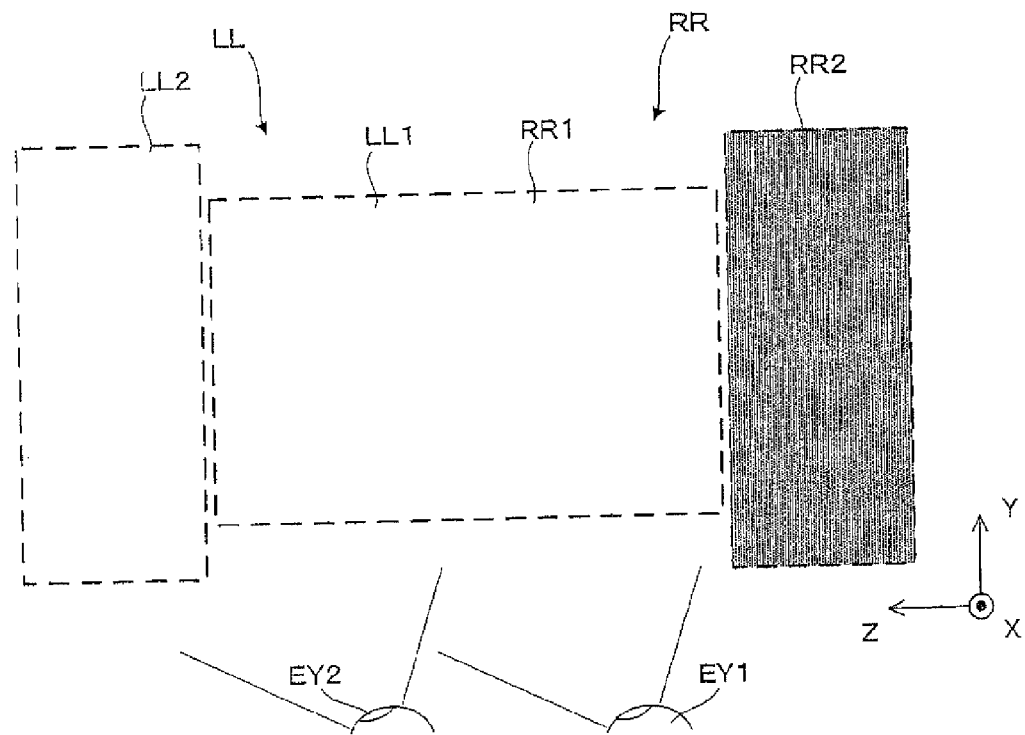
FIG. 8B shows the range of video images recognizable by the user when the user moves the eyes leftward.

Further, a recognizable range of video images can be limited in accordance with wearer's action of moving the eyes EY (EY1, EY2) or the line of sight rightward or leftward, as shown in FIG. 8A or 8B. Specifically, when the eyes EY or the line of sight is moved rightward (toward −Z side) as shown in FIG. 8A, the range of video image areas recognized with the eyes EY may be so adjusted that the entire second video image area RR2 and part or all of the first video image area RR1 fall within the field of view of the right eye EY1, whereas the entire first video image area LL1 falls within the field of view of the left eye EY2 but the second video image area LL2 does not fall within the field of view of the left eye EY2. Conversely, when the eyes EY or the line of sight is moved leftward (toward +z, side) as shown in FIG. 8B, the recognizable range of the video image areas may be so adjusted that the entire second video image area LL2 and part or all of the first video image area LL1 fall within the field of view of the left eye EY2, whereas the entire first video image area RR1 falls within the field of view of the right eye EY1 but the second video image area RR2 does not fall within the field of view of the right eye EY1.

Further, the trapezoidal correction processing portion 53 may perform trapezoidal correction only on the right-eye-side first video image area RR1 and the left-eye-side first video image area LL1, where video images common to the right and left sides are displayed, whereas the amount of trapezoidal correction corresponding to the right-eye-side second video image area RR2 and the left-eye-side second video image area LL2 may be zero. For example, when information displayed in the right-eye-side second video image area RR2 and the left-eye-side second video image area LL2 is formed of icons or any other similar object, each of the second video image areas does not necessarily have a rectangular shape, and a shape distorted to some extent can be recognized by the wearer. The image correction may therefore be performed only on the right-eye-side first video image area RR1 and the left-eye-side first video image area LL1, where primary video images are displayed, whereby the image processing burden on the trapezoidal correction processing portion 53 can be reduced.

As described above, in the virtual image display apparatus 100 according to the present embodiment, the trapezoidal correction processing portion 53 performs trapezoidal correction (distortion correction) on the video image areas RR and LL, each of which is divided into a plurality of video image areas, separately in accordance with the divided video image areas RR1, RR2, LL1, and LL2. In this case, dividing each of the video image areas RR and LL into a plurality of areas, for example, reduces the size of an unused, waste area and hence increases the size of each of the video image areas RR and LL to be used. Further, in this case, the amount of correction in each of the divided video image areas RR1, RR2, LL1, and LL2, which are obtained by dividing the video image areas RR and LL, can be smaller than the amount of correction in a case where each of the entire video image areas is handled, for example, as a single rectangular area for trapezoidal correction. As a result, in each of the divided video images, a decrease in resolution resulting from distortion correction can be suppressed.

Further, the virtual image formation section 20 is formed of the pair of right-eye-side virtual image formation section 20R and left-eye-side virtual image formation section 20L, and the trapezoidal correction processing portion 53 performs trapezoidal correction on the two virtual image formation sections in a mirror symmetric manner, whereby the correction is well balanced in the rightward/leftward direction (Z direction). As a result, the pixels on the right and left sides can be more accurately aligned with each other than in a case where correction is separately performed on the right and left sides, whereby images recognized with the right and left eyes can be more reliably recognized as a single common image.

Further, the center positions of the video image areas RR and LL (centers AX1 and AX2) are shifted from the center positions of the eyes of the wearer (centers EX1 and EX2) who wears the apparatus. In this case, the shift can, for example, be so made that the center positions of the eyes coincide with the center positions of areas where distortion-free images can be formed by using a small amount of correction.

It is also conceivable to make adjustment in accordance with the type of distortion by changing the scan amplitude and speed of the MEMS. In this case, however, it is likely that the MEMS driver needs to be complicated, and that it is therefore difficult to reduce the size of the apparatus. In the present embodiment, even when a MEMS that operates only in a relatively simple manner is employed to achieve lightweight and compactness of the apparatus, a high-quality image can be provided by using a small amount of correction.

In the above description, the light output section 10 in the virtual image display apparatus 100 is disposed in a position away from the eye EY of the wearer who wears the apparatus toward the nose NS in the horizontal direction perpendicular to the optical axis OA. In this case, the light output section 10 does not protrude in the sideways direction of the wearer, that is, in the Z direction. Further, the light output section 10 is disposed between the wearer's eye EY and the virtual image formation section 20, as described above. In this case, the light output section 10 does not protrude forward from the virtual image formation section 20.

Second Embodiment

A virtual image display apparatus according to a second embodiment will be described below. The virtual image display apparatus according to the present embodiment is a variation of the virtual image display apparatus 100 according to the first embodiment and is the same as the virtual image display apparatus 100 according to the first embodiment unless otherwise specified. Further, the right-eye side and the left-eye side are the same but only reversed. Therefore, only the right-eye side will be described and no description of the left-eye side will be made. In the present embodiment as well, the first display unit functions by itself as a virtual image display apparatus.

Figure 9:
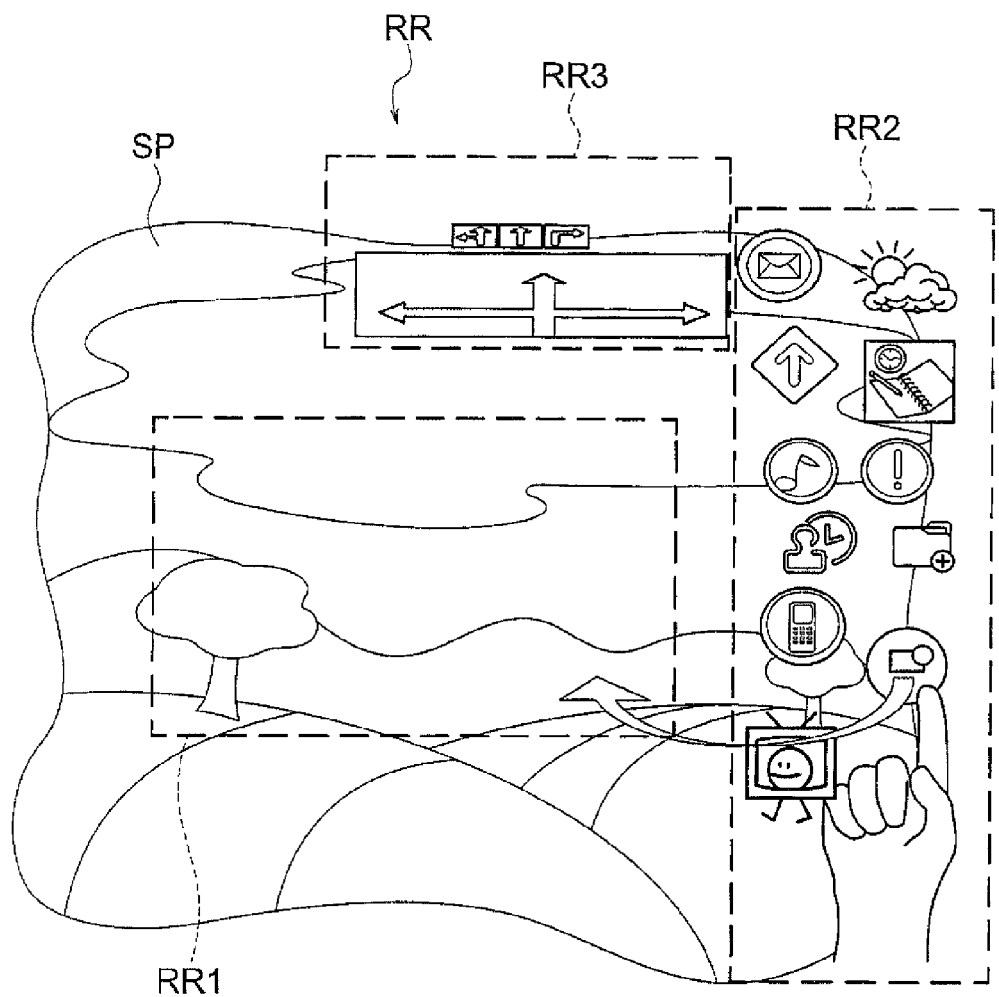
FIG. 9 shows video image areas in a virtual image display apparatus according to a second embodiment.

In the virtual image display apparatus according to the present embodiment, the video image area RR is divided into three areas, a first video image area RR1, a second video image area RR2, and a third video image area RR3, as shown in FIG. 9. In this case, the third video image area RR3 can display video images having a content different from those of video images in the display areas defined by the first video image area RR1 and the second video image area RR2. A variety of conceivable contents can be displayed in these video image areas. For example, information on a variety of instructions can be displayed by using icons in the second video image area RR2, and information obtained by the variety of instructions can be displayed in the third video image area RR3, as shown in FIG. 9. In this case, among a plurality of displayed icons in the second video image area RR2 as in the first embodiment, not only can the user select a content to be moved into the first video image area RR1 by moving a pointer represented by a finger shape and selecting (tapping) one of the displayed icons, but also the user can extract road information on an outside image SP by selecting an appropriate icon displayed in the second video image area RR2, for example, as shown in FIG. 9. The thus obtained road information can be displayed in the third video image area RR3.

Third Embodiment

A virtual image display apparatus according to a third embodiment will be described below. The virtual image display apparatus according to the present embodiment is a variation of the virtual image display apparatus 100 according to the first embodiment and is the same as the virtual image display apparatus 100 according to the first embodiment unless otherwise specified.

Figure 10:
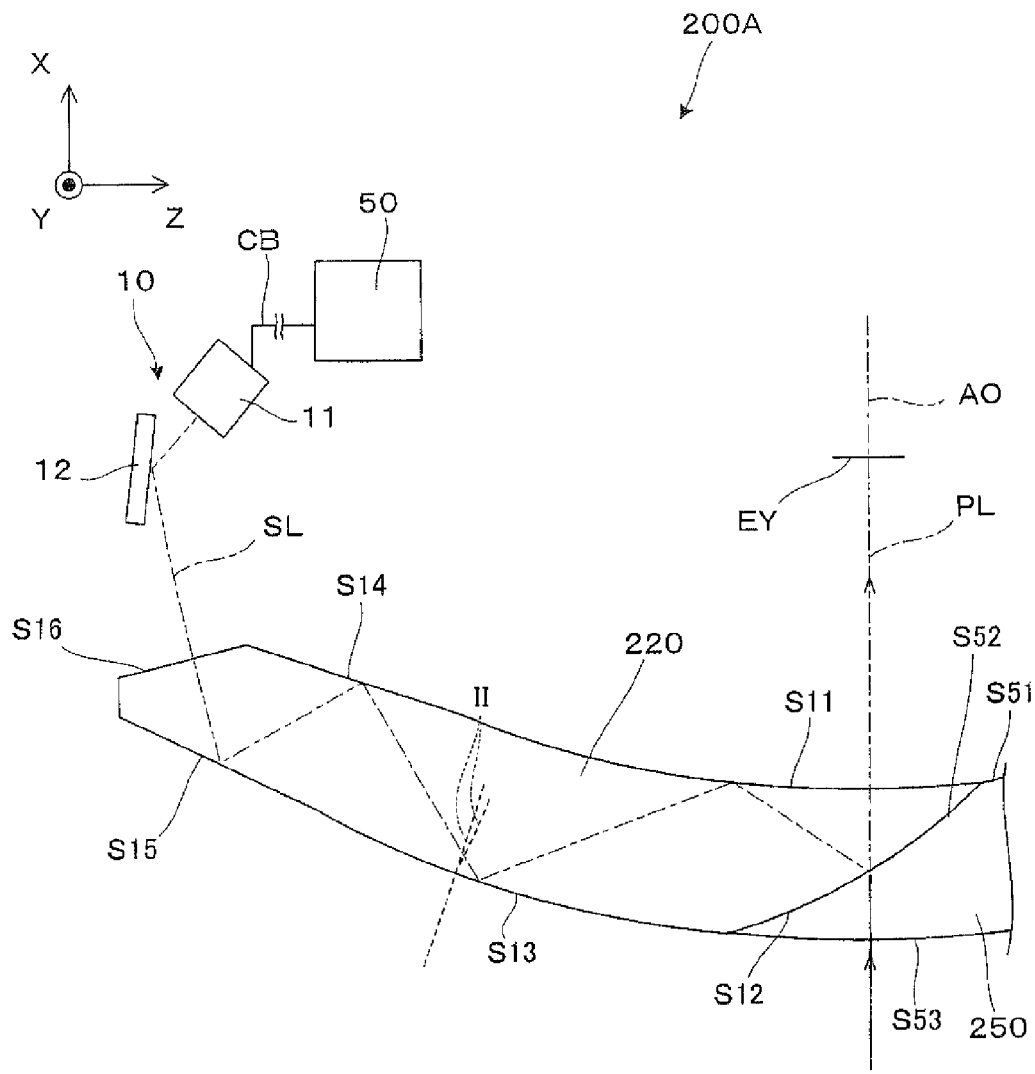
FIG. 10 is a plan view of a virtual image display apparatus according to a third embodiment.

FIG. 10 is a plan view of the virtual image display apparatus according to the present embodiment. As shown in FIG. 10, a first display unit 200A of a virtual image display apparatus 200 according to the present embodiment includes a light output section 10 including a video image generation section, a light guide member 220, which is a virtual image formation section, and a light transmissive member 250. The light guide member 220 and the light transmissive member 250, each of which is a light transmissive prism member, are bonded to and integrated with each other. The virtual image display apparatus 200 further includes a controller 50 including an image processing section, and the controller 50 is connected to the light output section 10 via a cable CB.

The light guide member 220 is an arcuate member curved along the wearer's face in a plan view and has first to sixth surfaces S11 to S16 as side surfaces having optical functions sequentially arranged from the light exiting side. The surfaces are disposed as follows: The first surface S11 and the fourth surface S14 are adjacent to each other; the third surface S13 and the fifth surface S15 are adjacent to each other; the second surface S12 is disposed between the first surface S11 and the third surface S13; and the sixth surface S16 is disposed between the fourth surface S14 and the fifth surface S15. The surfaces S11 to S16, each of which is a free-form surface, guide scan light SL having exited out of the light output section 10 into the light guide member 220 based on total reflection using mirrors and total reflection using inner surfaces based on a difference in refractive index between each surface and an air layer and adjust the optical path of the scan light SL to output it as image light PL, which will form a desired virtual image. That is, the light guide member 220 is a prism member that functions as a virtual image formation section. The guided light forms an intermediate image in a position labeled as an image plane II before or after the light travels via the third surface S13.

The light transmissive member 250 is a member (auxiliary prism) that assists a see-through function of the light guide member 220, is made of the same material of which the light guide member 220 is made, and has a first transmissive surface S51, a second transmissive surface S52, and a third transmissive surface S53 as side surfaces having optical functions. The second transmissive surface S52 is disposed between the first transmissive surface S51 and the third transmissive surface S53. The first transmissive surface S51 is a curved surface that coincides with an extension of the first surface S11 of the light guide member 220. The second transmissive surface S52 is a curved surface bonded to and integrated with the second surface S12 via an adhesive layer. The third transmissive surface S53 is a curved surface that coincides with an extension of the third surface S13 of the light guide member 220. The second transmissive surface S52 and the second surface S12 of the light guide member 220, which are bonded to and integrated with each other, have shapes having substantially the same curvature.

In the light guide member 220, each of the first surface S11 and the third surface S13 is disposed in front of the eye EY and has a concave shape toward the viewer (user), and the diopter is substantially zero when the viewer observes outside light through the first surface S11 and the third surface S13. In the light transmissive member 250, the first transmissive surface S51 and the third transmissive surface 553, which coincide with extensions of the first surface S11 and the third surface S13 respectively, also provide a diopter of about zero. That is, the integrated light guide member 220 and light transmissive member 250 as a whole also provide a diopter of about zero.

In the present embodiment as well, dividing the entire video image area into a plurality of areas under the control of the controller 50 including the image processing section increases each of the video image areas to be used and reduces the amount of correction in each of the divided video image areas, whereby a decrease in resolution resulting from distortion correction can be suppressed in each of the divided video images.

The invention is not limited to the embodiments described above and can be implemented in a variety of other aspects to the extent that they do not depart from the substance of the invention.

In the above description, the video image generation section is formed of the light output section 10, which is formed of a MEMS mirror and other components, but the image projection is not necessarily performed based on the MEMS mirror configuration. For example, in an apparatus in which a liquid crystal panel, an organic EL, or any other similar device is used to form an image, the correction may be made in the same manner described above.

Further, for example, the aspect ratio of the first video image area RR1, which is a rectangular area, is 16:9 in consideration motion images to be displayed in the first video image area RR1, but the first video image area RR1 may have a variety of other shapes. That is, the aspect ratio may be changed as appropriate to an aspect ratio corresponding to video images to be displayed. Further, the size of each of the first video image area RR1 and the second video image area RR2 may be changed. For example, changing the aspect ratio of the first video image area RR1 changes the range of the unused portion of the first video image area RR1. The shape of the second video image area RR2 may therefore be changed in accordance with the change.

Further, in the above description, the image processing section 52 is formed of the two image processing portions 52R and 52L for the right and left eyes. The two image processing portions can be replaced with a single image processing portion. Further, the light output section 10 is also formed of the two light output sections, the light output section 10R and the light output section 10L, in the above description. For example, a single MEMS mirror may be configured to cover both the right and left sides to form video images in the two video image areas RR and LL. On the other hand, the single trapezoidal correction processing portion 53 is used in the above description, but two trapezoidal correction processing portions for the right and left eyes may be provided.

Further, in the structure of the signal light modulator 11 shown in FIG. 3A and other figures described above, the combined light formation portion 11a combines the light fluxes from the color light sources 11r, 11g, and 11b with one another to form the signal light GL. The configuration described above is an example of the signal light formation in the present embodiment, and the signal light GL can be formed based on any other configuration.

In the above description, a diode laser light source or an LED light source is used as each of the light sources, but each of the light sources may be any other device based, for example, on organic EL.

In the virtual image display apparatus 100 and other virtual image display apparatus according to the above embodiments, each of the right and left eyes is provided with the light output section 10 and other components, but only one of the right and left eyes may be provided therewith for monocular image observation.

The virtual image formation section 20 according to the first embodiment described above receives the scan light SL having exited out of the scan system 12 and reflects the scan light SL to allow the wearer to recognize the scan light SL. The virtual image formation section 20 may instead be provided with a hologram element, which is a film-shaped member, for image formation. That is, diffraction in the hologram element can be used to form a virtual image based on image light of a specific wavelength band, and outside light of a wide wavelength band may be allowed to pass through the hologram element for see-through observation.

The entire disclosure of Japanese Patent Application No. 2012-252967, filed Nov. 19, 2012 is expressly incorporated by reference herein.

What is claimed is:

1. A virtual image display apparatus comprising:
an image processing section that processes an image signal that allows a user to visually recognize a virtual image in accordance with an input signal, the virtual image being one of a right-eye virtual image and a left-eye virtual image;
a video image generation section that generates light that allows the user to visually recognize the virtual image in accordance with the image signal from the image processing section; and
a virtual image formation section that allows the user to visually recognize the light from the video image generation section in the form of the virtual image displayed in an imaginary video image area,
wherein when the video image generation section generates the light and the virtual image formation section allows the user to visually recognize the light from the video image generation section in the form of the virtual image, distortion is produced at least in one of horizontal and vertical directions,
the image processing section includes a distortion correction processing portion that performs distortion correction on the virtual image to be recognized by the user, and
the image processing section divides the video image area, which the virtual image formation section allows the user to visually recognize, into a plurality of divided video image areas, and the distortion correction processing portion performs distortion correction in correspondence with each of the divided video image areas, the plurality of divided video image areas including at least a first video image area and a second video image area, the distortion correction processing portion being configured to selectively perform distortion correction in the first video image area without performing distortion correction in the second video image area.

2. The virtual image display apparatus according to claim 1, wherein
the distortion correction processing portion performs individual distortion correction in correspondence with each of the divided video image areas.

3. The virtual image display apparatus according to claim 1, wherein
the first video image area is located in an inner position and the second video image area is located in an outer position.

4. The virtual image display apparatus according to claim 3, further comprising
an input reception section that receives an instruction from the user,
wherein the image processing section displays an icon related to the receiving action of the input reception section in the second video image area, which the virtual image formation section allows the user to visually recognize.

5. The virtual image display apparatus according to claim 3, wherein
the virtual image formation section is formed of a pair of a right-eye-side virtual image formation section and a left-eye-side virtual image formation section that correspond to the right and left eyes respectively,
the image processing section processes the image signal in such a way that the first video image area of the video image area that the right-eye-side virtual image formation section allows the user to visually recognize includes a right-eye-side first video image area and the second video image area of the video image area that the right-eye-side virtual image formation section allows the user to visually recognize includes a right-eye-side second video image area,
the image processing section processes the image signal in such a way that the first video image area of the video image area that the left-eye-side virtual image formation section allows the user to visually recognize includes a left-eye-side first video image area and the second video image area of the video image area that the left-eye-side virtual image formation section allows the user to visually recognize includes a left-eye-side second video image area, and the image processing section displays video images common to the right and left sides in the right-eye-side first video image area and the left-eye-side first video image area.

6. The virtual image display apparatus according to claim 5, wherein
the image processing section displays independent video images formed in the right-eye-side second video image area and displays other independent video images formed in the left-eye-side second video image area.

7. The virtual image display apparatus according to claim 5, wherein
the distortion correction processing portion performs distortion correction only on the right-eye-side first video image area and the left-eye-side first video image area, where the video images common to the right and left sides are displayed.

8. The virtual image display apparatus according to claim 5, wherein
the image processing section forms the right-eye-side second video image area, which the right-eye-side virtual image formation section allows the user to visually recognize, in a range outside the vision of the user when the user moves the line of sight leftward, whereas forming the left-eye-side second video image area, which the left-eye-side virtual image formation section allows the user to visually recognize, in a range outside the vision of the user when the user moves the line of sight rightward.

9. The virtual image display apparatus to claim 1, wherein
the video image generation section and/or the virtual image formation section produces at least horizontal trapezoidal distortion.

10. The virtual image display apparatus according to claim 1, wherein
the video image generation section includes a signal light modulator that outputs signal light modulated in correspondence with an image and a scan system that causes the signal light incident from the signal light modulator to undergo a scan process and outputs the resultant light as scan light.

11. A virtual image display apparatus comprising:
an image processing section that processes an image signal that allows a user to visually recognize a virtual image in accordance with an input signal;
a video image generation section that generates light that allows the user to visually recognize the virtual image in accordance with the image signal from the image processing section; and
a virtual image formation section that allows the user to visually recognize the light from the video image generation section in the form of the virtual image displayed in an imaginary video image area,
wherein when the video image generation section generates the light and the virtual image formation section allows the user to visually recognize the light from the video image generation section in the form of the virtual image, distortion is produced at least in one of horizontal and vertical directions,
the image processing section includes a distortion correction processing portion that performs distortion correction on the virtual image to be recognized by the user,
the virtual image formation section is formed of a pair of a right-eye-side virtual image formation section and a left-eye-side virtual image formation section that correspond to the right and left eyes respectively,
the distortion correction processing portion performs distortion correction on the right-eye-side virtual image formation section and distortion correction on the left-eye-side virtual image formation section in a mirror symmetric manner with respect to an axis of symmetry in a rightward/leftward direction, the distortion correction processing portion performing distortion correction such that coordinates of original image data match coordinates of the video image area when the original image data is projected on the virtual image formation section,
the image processing section divides the video image area, which the virtual image formation section allows the user to visually recognize, into a plurality of divided video image areas and processes the image signal in such a way that the divided video image areas include a first video image area that is located in an inner position and a second video image area that is located in an outer position,
the image processing section processes the image signal in such a way that the first video image area of the video image area that the right-eye-side virtual image formation section allows the user to visually recognize includes a right-eye-side first video image area and the second video image area of the video image area that the right-eye-side virtual image formation section allows the user to visually recognize includes a right-eye-side second video image area,
the image processing section processes the image signal in such a way that the first video image area of the video image area that the left-eye-side virtual image formation section allows the user to visually recognize includes a left-eye-side first video image area and the second video image area of the video image area that the left-eye-side virtual image formation section allows the user to visually recognize includes a left-eye-side second video image area, and
the image processing section displays video images common to the right and left sides in the right-eye-side first video image area and the left-eye-side first video image area.

12. The virtual image display apparatus to claim 11, wherein
the video image generation section and/or the virtual image formation section produces at least horizontal trapezoidal distortion.

13. The virtual image display apparatus according to claim 11, wherein
the video image generation section includes a signal light modulator that outputs signal light modulated in correspondence with an image and a scan system that causes the signal light incident from the signal light modulator to undergo a scan process and outputs the resultant light as scan light.

14. A virtual image display apparatus comprising:
an image processing section that processes an image signal that allows a user to visually recognize a virtual image in accordance with an input signal;
a video image generation section that generates light that allows the user to visually recognize the virtual image in accordance with the image signal from the image processing section; and
a virtual image formation section that allows the user to visually recognize the light from the video image generation section in the form of the virtual image displayed in an imaginary video image area, the video image generation section projecting the light only in the video image area, wherein when the video image generation section generates the light and the virtual image formation section allows the user to visually recognize the light from the video image generation section in the form of the virtual image, distortion is produced at least in one of horizontal and vertical directions, the image processing section includes a distortion correction processing portion that performs distortion correction on the virtual image to be recognized by the user, the image processing section divides the video image area, which the virtual image formation section allows the user to visually recognize, into a plurality of divided video image areas and processes the image signal in such a way that the divided video image areas include a first video image area that is located in an inner position and a second video image area that is located in an outer position, the first video image area and the second video image area not overlapping each other, and the virtual image display apparatus further comprises a position adjustment mechanism that aligns a center position of the first video image area of the video image area with a center position of an eye of the user who wears the apparatus while simultaneously, in the virtual image formation section, a center position of the video image area is shifted from the center position of the eye of the user who wears the apparatus.

15. The virtual image display apparatus to claim 14, wherein the video image generation section and/or the virtual image formation section produces at least horizontal trapezoidal distortion.

16. The virtual image display apparatus according to claim 14, wherein the video image generation section includes a signal light modulator that outputs signal light modulated in correspondence with an image and a scan system that causes the signal light incident from the signal light modulator to undergo a scan process and outputs the resultant light as scan light.

* * * * *